Jan. 13, 1970  S. C. CATANIA  3,488,999
CYCLIC HYDRAULIC ACTUATOR SYSTEM CONTROL
Filed Sept. 19, 1967  3 Sheets-Sheet 1

INVENTOR
SALVATORE C. CATANIA
BY Maleson, Kimmelman + Ratner
ATTORNEYS.

United States Patent Office 3,488,999
Patented Jan. 13, 1970

3,488,999
CYCLIC HYDRAULIC ACTUATOR SYSTEM CONTROL
Salvatore C. Catania, Cornwells Heights, Pa., assignor to Weston Instruments, Inc., Newark, N.J., a corporation of Delaware
Filed Sept. 19, 1967, Ser. No. 668,765
Int. Cl. G01n 29/00, 3/00
U.S. Cl. 73—71.6                                    9 Claims

ABSTRACT OF THE DISCLOSURE

A control loop and an amplitude controller for a swept frequency hydraulic actuator system. The actuator system applies vibration and fatigue loads to test specimens. The amplitude controller determines any difference between the actual and desired movement of the load and is effective to vary an actuator command signal in a direction to reduce the difference to zero.

---

This invention relates to the control of cyclically operated hydraulic systems and particularly to hydraulic systems for applying vibration loads and fatigue loads to test specimens.

It has been known to apply vibration and fatigue loads to a movable load which includes a specimen under test. In such vibration and fatigue testing a hydraulic actuator moves the load and fluid flow to the actuator is controlled by a servovalve. Signals associated with the movement of the load such as acceleration, velocity and position of the load may be generated and these signals may be fed back as error signals for control of the servovalve. For example in vibration testing it may be desired to control the position of the load for a specific test. In addition, the velocity or the acceleration of the load may be controlled in accordance with further testing of the specimen.

It has been found advantageous to perform the foregoing tests while sweeping a band of frequencies at differing sweep rates and maintaining the position, velocity and acceleration at desired values. The desired values are determined by command signals. However, it has been found that the band width of the band of frequencies to be swept has been limited in value as a result of the attenuation or magnification characteristics of the complete hydraulic system control loop. More particularly, at the higher end of the band the amplitudes of the actual load acceleration, velocity and position decrease rapidly from the desired command values as a result of the nature of the hydraulic system. Specifically, the parameters of the load, mass and volume of fluid greatly attenuate the command signals at high frequency. Accordingly, with a constant amplitude error signal to the servovalve, the amplitudes of the acceleration, velocity and position substantially decrease.

At the lower end of the band width, the actual acceleration and velocity of the load also decrease as a result of a D.C. signal which may be applied to maintain the mean level of the actuator at a desired position. The acceleration and velocity signals are inconsistent with the mean level signal and the actual amplitudes of the acceleration and velocity rapidly decrease from the desired values. Thus, the characteristics of prior systems have been limited in the frequency band over which the frequency may be swept while still maintaining proper control of load acceleration, velocity and position.

Accordingly, an object of the present invention is to widen the band width over which the hydraulic system operates.

In accordance with the present invention there is provided a hydraulic actuator for moving a load. The actuator is controlled by a servovalve which provides hydraulic fluid flow to the actuator in proportion to an applied cyclic error signal. A transducer is connected to the movable load and produces cyclic output signals related to the movement of the load. To complete a control loop, the transducer output is connected by way of a controller amplifier to the servovalve. The transducer output is also applied to an amplitude computer which produces a D.C. output signal proportional to the amplitude of the cyclic output signals of the transducer. A D.C. difference signal is produced equal to the difference between the D.C. output of the amplitude computer and a desired D.C. command signal. The difference signal is integrated and then multiplied by a constant amplitude signal of changing frequency. The resultant signal is applied to the controller amplifier so that when the amplitude of the transducer output signals is different from the desired command signal the difference signal varies. Thus, the error signal to the servovalve is varied in a direction to reduce the difference signal to zero. In this manner, the actual movement of the movable load is controlled to be substantially equal to the desired command signal, thereby to achieve a wide band width over which the system operates.

A complete understanding of the invention may be had by reference to the following detailed description when read in conjunction with the accompanying drawings illustrating embodiments thereof, in which.

Figure 1:
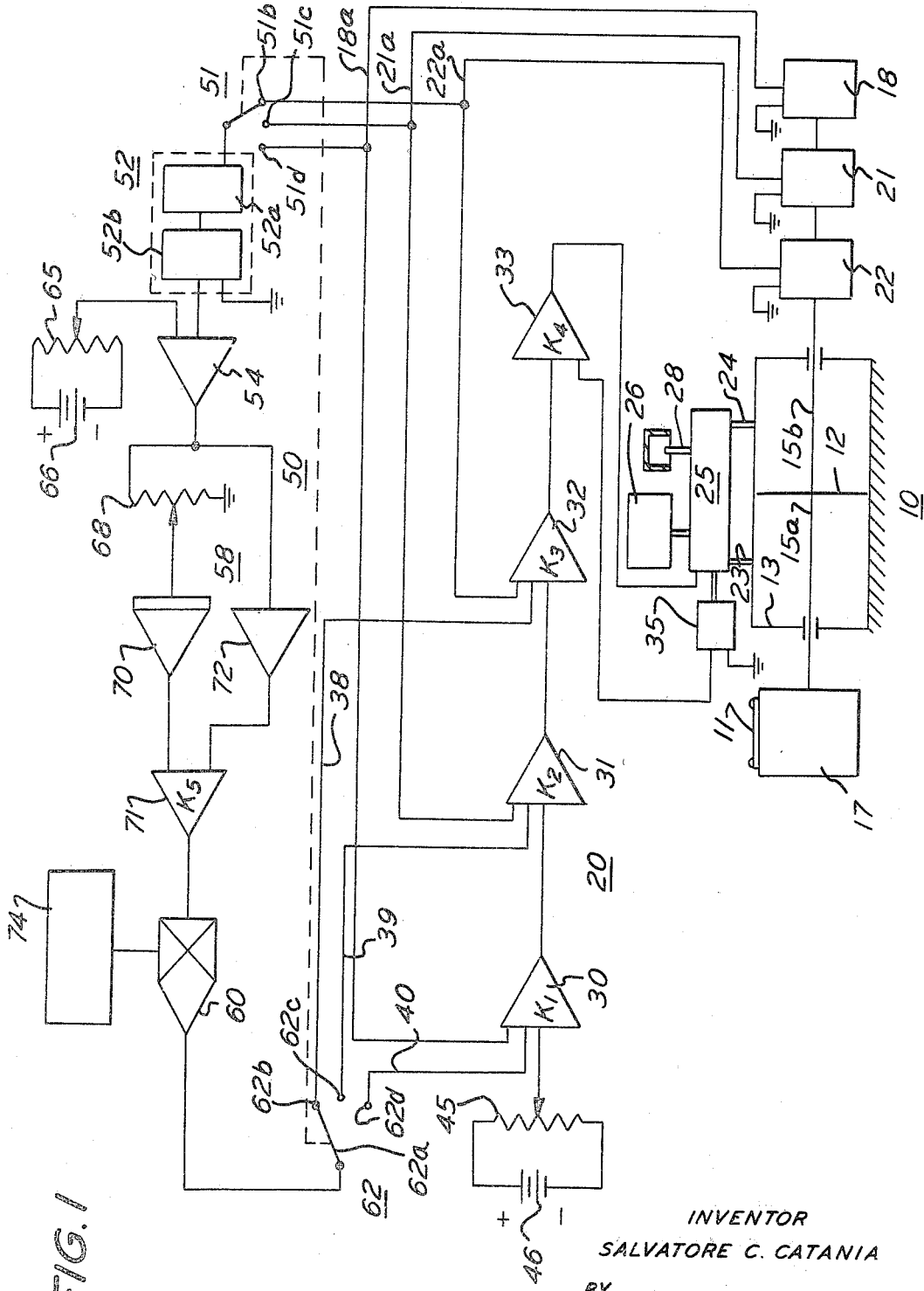
FIG. 1 is a block diagram of a hydraulic system for applying vibration loads embodying the invention.

Referring to FIG. 1 there is shown a cyclically operated hydraulic system for applying vibration loads to a load which includes a test specimen 11. While sinusoidal operation will be discussed, it will be understood that any other cyclic operation may be provided such as triangular wave-shape, rectangular wave-shape, etc. The hydraulic system comprises a symmetrical hydraulic actuator 10 having a movable piston 12 disposed within a fixed cylinder 13. A piston rod 15a extends from the left hand face of piston 12 with the end of rod 15a connected to a mass 17 carrying the test specimen 11. A piston rod 15b extends from the right hand face of piston 12 with the end of rod 15b carrying a position feedback transducer 18, a velocity transducer 21 and an acceleration transducer 22. Each of these transducers provides a feedback signal proportional to the respective position, velocity and acceleration of the movable elements of actuator 10. Such transducers are well known in the art and are described for example in a text by C. J. Savant, Jr., Control System Design, McGraw-Hill, 1956; the position transducer 18 at page 305 et seq., the velocity transducer 21 or induction tachometer at page 306 et seq. and the acceleration transducer 22 or accelerometer at page 311 et seq.

Accordingly, the load of the hydraulic system comprises specimen 11, mass 17, piston 12, rods 15a and 15b and transducers 18, 21 and 22 which are the movable elements associated with actuator 10. The fixed element is cylinder 13 of actuator 10 which is connected to a base with the left hand section of the cylinder being connected by way of a fluid connection 23 to a port of a servovalve 25. The right hand section of cylinder 13 is connected by way of a fluid connection 24 to a port of servovalve 25. An hydraulic power supply 26 providing filtered fluid at supply pressure is connected to an input of servovalve 25 and a tank return indicated by a drain 28 is also connected to the servovalve. Servovalve 25 is of the electro-hydraulic type and provides hydraulic flow to actuator 10 proportional to an applied electric signal. Such electro-hydraulic servovalves are well known in the art and a typical example is shown in Fig. 12.2 at page 105 of a text by R. Walters, Hydraulic and Electro-Hydraulic Servo Systems, CRC Press, 1967.

In order to control servovalve 25 to port hydraulic fluid into and out of cylinder 13 the servovalve is controlled by a multi-loop control configuration 20 comprising four amplifiers 30–33 having gains $K_1$, $K_2$, $K_3$ and $K_4$ respectively. Amplifiers 30–33 are all of the high quality DC or operational amplifier type and in particular amplifier 33 is selected to have a high current output and may be considered a power amplifier. Gains $K_1$–$K_4$ are each selected in accordance with the value of the total mass of the load, the area of the faces of piston 12, the volume of oil in the cylinder sections, the bulk modulus of the hydraulic fluid and response of servovalve 25.

Amplifier 30 is used as a position controller amplifier and has applied to an input thereof by way of feedback conductor 18a, the output of position feedback transducer 18. An output of amplifier 30 is applied to an input of amplifier 31 which is used as a velocity controller amplifier. Another input of amplifier 31 is connected by way of feedback conductor 21a, to an output of velocity transducer 21. An output of amplifier 31 is connected to an input of amplifier 32 which is used as an acceleration controller amplifier and has another input connected by way of feedback conductor 22a to an output of accelerometer 22. An output of amplifier 32 is applied to an input of power amplifier 33, the output of which is applied as the input signal to electrohydraulic servovalve 25.

Thus, it will now be understood that a first loop of the multi-loop control comprises accelerometer 22, amplifiers 32 and 33, servovalve 25 and actuator 10. The second loop comprises velocity transducer 21, amplifiers 31–33, servovalve 25 and actuator 10. The third and remaining loop compirses position feedback transducer 18, amplifiers 30–33, servovalve 25 and actuator 10.

In operation of the above described hydraulic system under multi-loop control 20, it may first be assumed that the system operates in the acceleration mode.

Thus, a predetermined amplitude sinusoidal command signal may be applied by way of a conductor 38 to an input of acceleration controller amplifier 32 while zero potential signals are applied by way of conductors 39 and 40 to respective inputs of velocity and position amplifiers 31 and 30. The command signals on conductors 38–40 may be provided by controller 50 which will later be discussed in detail. An additional signal comprising a DC potential is applied to an input of amplifier 30 by way of a movable contact of a potentiometer 45 having its fixed contacts connected across a battery 46. The setting of potentiometer 45 controls the mean level of the actuator which is the center position about which piston 12 vibrates.

Upon application of a command signal to amplifier 32, piston 12 vibrates about a predetermined mean position with the acceleration of the movable elements associated with actuator 10 being proportional to the amplitude of the command or control signal applied to amplifier 32. This acceleration control is achieved for the reason that the acceleration feedback by way of conductor 22a is applied as an additional input to amplifier 32. If the sinusoidal feedback signal is different from the sinusoidal command signal, an error signal is produced which is applied by way of amplifier 33 to vary the position of the servovalve to reduce the error. In the acceleration mode the position and velocity amplifiers 30 and 31 are included to control the piston mean level and stabilize the system.

In the velocity mode a predetermined amplitude sinusoidal velocity command signal is applied only by way of conductor 39 and zero potential signals are applied by way of conductors 38 and 40. In this mode an error signal is produced between the value of the command signal on conductor 39 and the velocity feedback from transducer 21. A resultant error signal is applied by way of amplifiers 32 and 33 to control the servovalve thereby to decrease any velocity error. Similarly, in the position mode, a position command signal is applied by way of conductor 40 and zero potential signals are applied by way of conductors 39 and 38. If the position of the movable elements during oscillation are different from that required by the command signal then an erorr signal is produced. The error signal is applied by way of amplifiers 31–33 to control servovalve 25 to decrease the position error.

It will now be understood that the acceleration controller amplifier 32 is in the innermost loop closest to servovalve 25 of the multi-loop control configuration and position controller amplifier 30 is in the outermost loop farthest from servovalve 25. It can be shown from a theoretical bases that it makes no difference whether acceleration is the innermost loop and position in the outermost loop or position in the innermost loop and acceleration in the outermost loop. From a theoretical viewpoint the band width in either of these configurations would be the same. However, with acceleration in the outer loop it has been calculated that the gain required for each amplifier is substantially of greater value than with acceleration in the innermost loop. This calculation has been made with the band widths being equal. Thus, with acceleration controller amplifier 32 in the inner loop all of the amplifiers 30–33 may have lower gains and as a result noise levels are substantially reduced.

In a particular application, depending on the characteristics of servovalve 25 and the band width required, an additional position feedback transducer 35 may be mechanically fixed to servovalve 25. An output 35a of transducer 35 may be applied as an additional input to amplifier 33. In this manner, the position of the servovalve is fed back as an additional signal and aids in the stability of the system.

Figure 2:
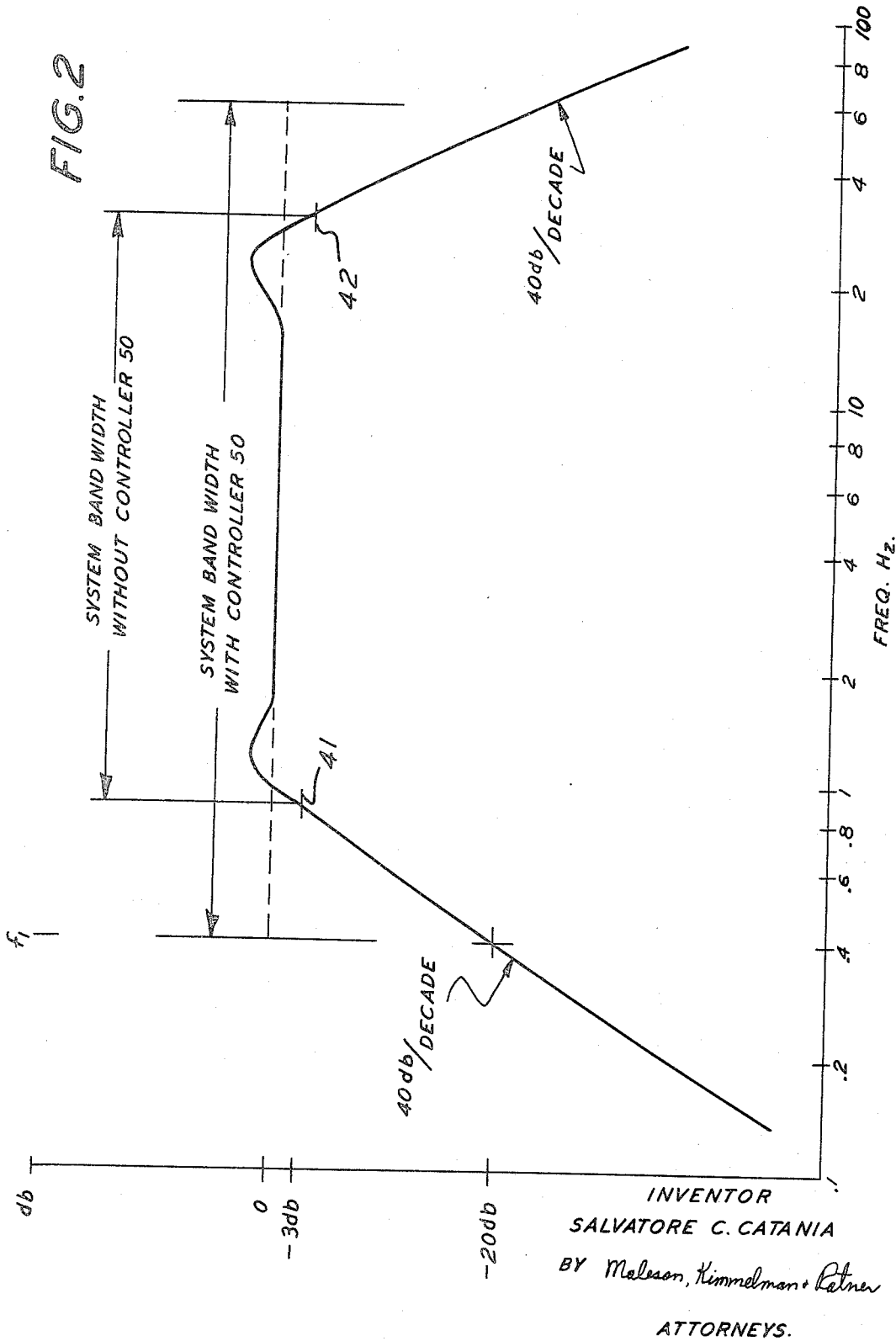
FIG. 2 is a graph helpful in understanding FIG. 1.

The hydraulic system has now been described under the sole control of the multi-loop control configuration 20 without considering the effect of the outer loop amplitude controller 50. Without outer loop controller 50 the system band width for acceleration is shown in FIG. 2 in which band width is measured between the lower and upper three db points 41 and 42 respectively. In FIG. 2 the actual acceleration of the load $\ddot{x}$ divided by a command acceleration signal $\ddot{x}_{command}$ has been plotted in db against frequency. Thus the system band width between points 41 and 42 indicates the frequencies at which the actual acceleration of the load is substantially equal to the desired command acceleration. Above and below the system band width the actual acceleration is less than the command acceleration falling off at about 40 db per decade. By utilizing outer loop amplitude controller 50 the band width is effectively widened to a limit determined by the rangeability of the differing components of controller 50.

Controller 50 comprises an amplitude computer 52 having its output applied by way of an amplifier 54, a proportional plus integral circuit 58, to a multiplier 60. The input to computer 52 is connected to a movable contact 51a of a multiple contact switch 51 having fixed terminals 51b–51d connected to feedback conductors 22a, 21a and 18a respectively. Contact 51a is ganged to movable contact 62a connected to the output of multiplier 60. The fixed terminals 62b–62d of multiple contact switch 62 are connected to conductors 38–40 respectively. Accordingly, with ganged contacts 51a and 62a in their illustrated position, the output of accelerometer 22 is applied to controller 50 and the output of controller 50 is applied as a command signal to acceleration controller amplifier 32.

Basically, controller 50 operates to increase or decrease the value of the command potential to adjust the curve of FIG. 2 to prevent the amplitude ratio $\ddot{x}/\ddot{x}_{command}$ from varying. For example, at frequency $f_1$, FIG. 2, the actual acceleration is 20 db below the command signal. Thus, it is desired to increase the actual command signal applied to amplifier 32 by 20 db. Accordingly, the output of accelerometer 22 is applied by way of switch 51 to controller 50 which is effective to increase the accelerometer output signal by 20 db. That amplified signal is applied by way of switch 62 and conductor 38 to amplifier 32. In this manner at frequency $f_1$ the actual acceleration of the load is increased 20 db to provide a ratio of actual acceleration to desired command acceleration of zero db or one.

In order to provide the foregoing constant amplitude of acceleration, controller 50 operates as follows. A potentiometer 65 is provided having fixed terminals connected across a battery 66. A movable contact of potentiometer 65 is adjusted in accordance with a desired command amplitude of the acceleration and is connected to a remaining input of operational amplifier 54. As previously described, the output 22a of accelerometer 22 is applied to amplitude computer 52 which provides a D.C. output signal proportional to the actual amplitude of the load acceleration $\ddot{x}$. Amplitude computer 52 may comprise a voltage peak reading system in which the output is averaged as well known in the art. Computer 52 may also comprise a time division multiplier 52a connected to a resolver 52b. The input to computer 52 is applied to multiplier 52a in which the sinusoidal input signal is multiplied by the sine and cosine of an analysis frequency as described in patent application Ser. No. 606,205 for Analog Analyzer filed Dec. 30, 1966, by A. M. Fuchs et al. and assigned to the same assignee as the present invention. The real and imaginary outputs of multiplier 52a are applied to a resolver 52b which produces a D.C. output as described for example at page 286, Korn and Korn, Electronic Analog Computers, McGraw-Hill, 1952.

The output of amplitude computer 52 is applied to amplifier 54 which produces a D.C. output indicating the difference between the desired amplitude of the acceleration and the actual amplitude of the acceleration. This difference signal is applied to network 58 which provides proportional plus integral control. Specifically, the output of amplifier 54 is applied by way of a fixed terminal of a potentiometer 68, the movable contact thereof, an integrator 70 and to one input of an operational amplifier 71. Accordingly, upon application of a D.C. difference signal from amplifier 54, integrator 70 begins to integrate that signal and produces an integrated output which is applied to amplifier 71.

The output of amplifier 54 is also applied by way of an operational amplifier 72 having a gain of one to the other input of amplifier 71. Amplifier 72 provides an input to amplifier 71 which is proportional to the output of amplifier 54 and thus network 58 has a substantially higher frequency response than would result from an integrator circuit alone. In this way the frequency response of the entire controller 50 is increased.

The output of amplifier 71 is applied to one input of a multiplier 60 the other input of which is connected to a constant amplitude cyclic programmer 74. Multiplier 60 may be any one of the type well known in the art such as quarter square multipliers, pulse height-pulse width multipliers, etc. as described for example in a text by Rogers and Connolly, Analog Computation in Engineering Design, McGraw-Hill, 1960, page 132 et seq. Cyclic programmer 74 may be a swept frequency oscillator or a tape recorder for example, to provide a constant amplitude signal of changing frequency for sweeping a desired band width such as that shown in FIG. 2.

The output of multiplier 60 is applied by way of a movable contact 62a, fixed contact 62b, conductor 38 to the input of amplifier 32. Thus, if the acceleration feedback signal from accelerometer 22 has an amplitude which is less than a desired command value provided by potentiometer 65, the output of amplifier 54 provides a D.C. difference signal which is integrated by integrator 70 to raise the output D.C. potential of network 58. This rise in network output potential is multiplied by the constant amplitude sweep frequency thereby increasing the input to amplifier 32 and increasing the error signal to the servovalve. In this manner, the amplitude of the acceleration of the hydraulic system is increased to a value to reduce the difference output of amplifier 54 to zero. It will be understood that the acceleration output signal may be of greater amplitude than the desired command signal. Accordingly, controller 58 produces a signal to decrease the input to amplifier 32 thereby decreasing the error signal to servovalve 25 which is in a direction to reduce the difference signal to zero.

Multiplier 60 requires two finite value input signals and even though the error output signal of amplifier 54 may decrease to zero potential, integrator 70 maintains a finite value input signal to multiplier 60. Accordingly, the integrator network 58 allows the use of a zero error system.

The foregoing explanation of controller 50 has been discussed in relation with acceleration control of a vibration system. It will be understood that ganged switches 51 and 62 may be actuated so that the output of velocity transducer 21 is applied to amplitude computer 51 and the output of multiplier 60 is applied as an input to amplifier 31. In this manner the actual velocity amplitude $\dot{x}$ of the load is controlled to be substantially equal to the desired command velocity amplitude provided by potentiometer 65.

Similarly, ganged switches 51 and 62 may be actuated so that the output of position feedback transducer 18 is applied to computer 52 and the output of multiplier 60 is applied as an input to amplifier 30. In this manner the actual position of the load $x$ is controlled to be substantially equal to the command position amplitude provided by potentiometer 65.

Figure 3:
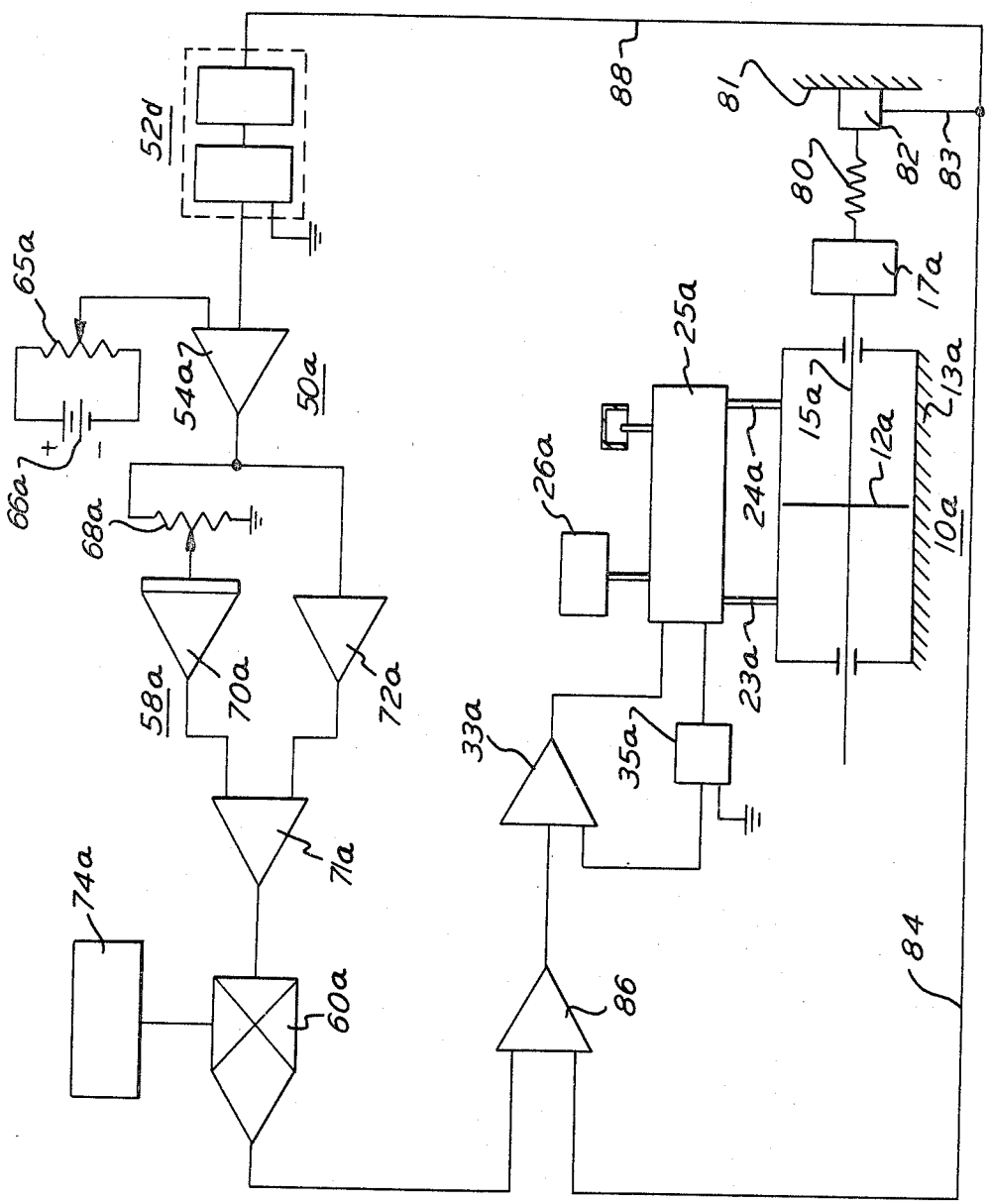
FIG. 3 is a block diagram of a hydraulic system for applying fatigue loads in accordance with another embodiment of the invention.

A further embodiment of the invention as shown in FIG. 3 in which the movable elements 12a, 15a and 17a of actuator 10a apply tension and compression loads to a test specimen 80 having one end connected by way of load cells 82 to a base 81. FIG. 3 is similar to FIG. 1 and corresponding parts have been identified with the same reference character plus a suffix. Load cells 82 provide an output signal by way of conductors 83 and 84 to a fatigue system control loop comprising force controller amplifier 86 (an operational amplifier) and power amplifier 33a. The output of amplifier 33a is applied to control servovalve 25a. In addition, the output of load cell 82 is applied by way of conductors 83 and 88 to an input of outer loop amplitude controller 50a with the output of the controller being applied as the additional input to amplifier 86.

In a manner similar to that described with respect to FIG. 1 controller 50a operates to raise or lower the input command signal to amplifier 86 in accordance with the attenuation or magnification characteristics of the fatigue system control loop thereby to maintain the load cell output at a desired amplitude. Specifically, the force applied to specimen 80 is maintained at a desired value determined by the command setting of potentiometer 65a.

What is claimed is:
1. A system for cyclically operating over a wide band of frequencies an hydraulic actuator having a piston element and a cylinder element with one of said elements being fixed to a base and the other of said elements being movable with respect to said fixed element comprising,
transducer means secured to said movable element for producing at a transducer output cyclic output signals related to the movement of said movable element,
servovalve means having fluid connections to said cylinder element for cyclically providing hydraulic fluid flow to said cylinder element in proportion to an applied cyclic error signal,
controller amplifier means having a first input connected to said transducer output and an output con- nected to said servovalve means for applying said error signal thereto, amplitude means connected to said transducer output for producing a D.C. output signal proportional to the amplitude of said cyclic output signals, command means for producing a desired D.C. command signal, difference means for providing a D.C. signal equal to the difference between said desired command signal and said D.C. output signal, means for integrating said difference signal to produce an integrated output signal, means for multiplying said integrated output signal times a constant amplitude signal of changing frequency, and means for applying an output of said multiplying means to a second input of said controller amplifier means whereby when said amplitude of said cyclic output signal is different from said desired command signal said difference signal varies thereby to change said error signal in a direction to reduce said difference signal to zero.

2. The system of claim 1 in which said movable element applies vibration loads to said test specimen and in which said transducer means comprises transducers for producing signals proportional to the position, velocity and acceleration of said movable element and switching means for selectively applying a desired one of said signals to said amplitude means.

3. The system of claim 2 in which said controller amplifier means comprises a position, a velocity and an acceleration controller amplifier connected in series circuit relation with an output of said position amplifier being connected to a second input of said velocity amplifier and an output of said velocity amplifier being connected to a second input of said acceleration amplifier, means for applying an output of said third amplifier as an error signal to said servovalve means, means for applying each of said position, velocity and acceleration signals to respective first inputs of said position, velocity and acceleration amplifiers whereby said acceleration controller amplifier is in an innermost loop closest to said servovalve means and said position controller amplifier is in an outermost loop farthest from said servovalve means.

4. The system of claim 3 in which said applying means comprises a switching circuit responsive to said switching means for applying said output of said multiplier means to (1) a third input of said acceleration amplifier when said acceleration signal is applied to said amplitude means, (2) a third input of said velocity amplifier when said velocity signal is applied to said amplitude means and (3) a second input of said position amplifier when said position signal is applied to said amplitude means.

5. The system of claim 4 in which there is provided mean level means for applying a D.C. signal to a third input of said position amplifier to control the center position about which said movable element vibrates and a proportional amplifier connected between said difference means and said multiplying means for applying to said multiplying means a signal proportional to said difference signal.

6. A swept frequency hydraulic actuator system for applying vibration loads to a movable load which includes a specimen under test, transducer means connected to said movable load for producing separate signals proportional to the position, velocity and acceleration of said movable load, servovalve means having fluid connections to said actuator for providing hydraulic fluid flow to said actuator in proportion to an error signal, a position controller amplifier having applied to a first input thereof said position signal, a velocity controller amplifier having applied to a first input thereof said velocity signal and having applied to a second input thereof an output of said position amplifier, an acceleration controller amplifier having applied to a first input thereof said acceleration signal and having applied to a second input thereof an output of said velocity amplifier, means for applying an output of said acceleration amplifier as an error signal to said servovalve means, amplitude means having selectively applied thereto a desired one of said position, velocity and acceleration signals for producing a D.C. output signal proportional to the amplitude of the applied signal, command means for producing a D.C. command signal of desired value related to the applied signal, difference means for providing a D.C. signal equal to the difference between said desired command signal and said D.C. output signal of said amplitude means, means for integrating said difference signal and means for multiplying the resultant signal times a constant amplitude signal of varying frequency, and switching means for selectively applying an output of said multiplying means to (1) a second input of said position amplifier when said position signal is applied to said amplitude means, (2) a third input of said velocity amplifier when said velocity signal is applied to said amplitude means and (3) a third input of said acceleration amplifier when said acceleration signal is applied to said amplitude means whereby when said amplitude of said applied signal is different from said desired command signal said difference signal varies thereby to change said error signal in a direction to reduce said difference signal to zero.

7. The actuator system of claim 6 in which there is provided means level means for applying a D.C. signal to a third input of said position amplifier to control the center position about which said movable load vibrates.

8. The system of claim 7 in which there is provided an additional amplifier connected between said difference means and said multiplying means for applying to said multiplying means a signal proportional to said difference signal.

9. The system of claim 8 in which there is provided a power amplifier having a first input connected to an output of said acceleration amplifier and an output connected to said servovalve means, a position feedback transducer secured to said servovalve means and having an output connected to a second input of said power amplifier whereby the position of said servovalve means is fed back as an additional signal thereby to aid in hydraulic system stability.

References Cited

UNITED STATES PATENTS 2,955,460    10/1960    Stevens et al. _____ 73—71.6

OTHER REFERENCES

Pelloux et al.: Hydraulic Tension-Compression Fatigue Machine, The Review of Scientific Instruments, vol. 35, No. 11, November 1964, pp. 1564–1567.

RICHARD C. QUEISSER, Primary Examiner

J. P. BEAUCHAMP, Assistant Examiner

U.S. Cl. X.R.

73—92; 91—275

Disclaimer and Dedication 3,488,999.—*Salvatore C. Catania*, Cornwells Heights, Pa. CYCLIC HYDRAULIC ACTUATOR SYSTEM CONTROL. Patent dated Jan. 13, 1970. Disclaimer and dedication filed Feb. 4, 1970, by the assignee, *Weston Instruments, Inc.*

Hereby enters this disclaimer to the entire remaining term of said patent and dedicates the patent to the Public.

[*Official Gazette June 2, 1970.*]